(12) United States Patent
Sugimoto (10) Patent No.: US 7,417,661 B2
(45) Date of Patent: Aug. 26, 2008

(54) IMAGE FORMING APPARATUS AND PROGRAM PRODUCT OPTIMIZING SCANNER MOTOR OPERATION

(75) Inventor: Tasuku Sugimoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 323 days.

(21) Appl. No.: 11/264,146

(22) Filed: Nov. 2, 2005

(65) Prior Publication Data

US 2006/0098216 A1 May 11, 2006

(30) Foreign Application Priority Data

Nov. 5, 2004 (JP) ............................. 2004-322674

(51) Int. Cl.
*B41J 15/14* (2006.01)
*B41J 27/00* (2006.01)

(52) U.S. Cl. ...................................... 347/261; 347/243

(58) Field of Classification Search ......... 347/230–231, 347/243, 259–261
See application file for complete search history.

(56) References Cited

U.S. PATENT DOCUMENTS 5,883,659 A * 3/1999 Serizawa et al. ............ 347/260

7,248,276 B2 * 7/2007 Suzuki ........................ 347/237
2006/0033804 A1 * 2/2006 Dan ............................ 347/230

FOREIGN PATENT DOCUMENTS

| JP | A-5-2298 | 1/1993 |
|----|----------|--------|
| JP | A 09-109452 | 4/1997 |
| JP | A-10-6613 | 1/1998 |
| JP | A 2000-330447 | 11/2000 |
| JP | A-2001-83451 | 3/2001 |
| JP | A-2003-259677 | 9/2003 |

* cited by examiner

*Primary Examiner*—Hai C Pham
(74) *Attorney, Agent, or Firm*—Oliff & Berridge, PLC (57) ABSTRACT

An image forming apparatus including: a speed information detection unit detecting speed information corresponding to a rotational speed of a scanner motor; a first judgment unit judging if the scanner motor has arrived at a first reference speed being lower than a rotational speed in scanning within a first term; a second judgment unit judging if the scanner motor has arrived at a second reference speed being not lower than the first reference speed after the first term, when the first judgment unit judges that the scanner motor has not arrived at the first reference speed within the first term; and an image formation unit initiating an image formation process when the first judgment unit judges that the scanner motor has arrived at the first reference speed within the first term and when the second judgment unit judges that the scanner motor has arrived at the second reference speed.

9 Claims, 8 Drawing Sheets

IMAGE FORMING APPARATUS AND PROGRAM PRODUCT OPTIMIZING SCANNER MOTOR OPERATION

CROSS REFERENCE TO RELATED APPLICATION

This application claims priority from Japanese Patent Application No. 2004-322674, filed on Nov. 5, 2004, the entire subject matter of which is incorporated herein by reference.

TECHNICAL FIELD

Aspects of the invention relate to an image forming apparatus having a scanner motor for rotating a polygon mirror, and a program for an image forming apparatus.

BACKGROUND

Heretofore, as an image forming apparatus such as laser printer, there has been known one having a scanner motor which rotates a beam-scanning polygon mirror. The scanner motor usually uses oil or the like fluid in its bearing portion. Since the fluid is high in temperature dependency, a time period which is required since the start of the scanner motor till the arrival thereof at a predetermined rotational speed is liable to become longer at low temperatures than at normal temperatures. At the low temperatures, therefore, notwithstanding that the scanner motor is in a normal state, it sometimes fails to arrive at a reference speed within a prescribed term, so the normal state is erroneously sensed as the fault of the scanner motor.

To cope with the erroneous sensing, JP-A-2001-83451 discloses a technique wherein a temperature detection unit for detecting the temperature of the apparatus is disposed, and subject to the judgment of a low temperature state by the temperature detection unit, a predetermined term for judging that the rotational speed of the scanner motor has risen up to a revolution number actually usable is lengthened more than in an ordinary mode in accordance with the temperature, so as to prevent the erroneous sensing of the scanner motor fault. Thus, the erroneous sensing of the scanner motor fault can be suppressed.

SUMMARY

In the prior-art technique, however, the number of components increases, and a complicated configuration and a high cost are involved.

Besides, in recent years, it has been desired to shorten a first printout time (a time period which is required till the completion of the printing of a first sheet). In this regard, in the case where the time period for judging the scanner motor as being in a ready state is indiscriminately determined depending upon temperatures, (1) the ready state is not established within the time period, or conversely, (2) the ready state is established before the expiration of the time period, on account of a certain equipment variation or under some conditions. In the case (1), normal printing is sometimes impossible, and in the case (2), a wasteful time period sometimes lapses since the establishment of the ready state till the actual start of printing. Further, after a fixed time period, it is judged as the ready state forcibly. Thus, whether or not the scanner motor is actually faulty cannot be judged.

Aspects of the present invention provides an image forming apparatus and a program therefor which, at the start of a scanner motor, permit appropriate processing to proceed in accordance with a temperature, without relying upon its temperature detection unit.

According to an aspect of the invention, there is provided an image forming apparatus including: a scanner motor that rotates a polygon mirror; a speed information detection unit that detects speed information corresponding to a rotational speed of the scanner motor; a first judgment unit that judges on the basis of the speed information whether or not the scanner motor has arrived at a first reference speed, which is lower than a rotational speed in scanning, within a first term since drive initiation of the scanner motor; a second judgment unit that judges on the basis of the speed information whether or not the scanner motor has arrived at a second reference speed, which is not lower than the first reference speed, after the first term, in a case where the first judgment unit has judged that the scanner motor has not arrived at the first reference speed within the first term; and an image formation unit that initiates an image formation process in a case where the first judgment unit has judged that the scanner motor has arrived at the first reference speed within the first term, and in a case where the second judgment unit has judged that the scanner motor has arrived at the second reference speed.

In the case where the scanner motor has arrived at the first reference speed within the first term, it can be judged that the scanner motor is operating at a normal temperature. Usually, a time period for conveying a sheet of paper, etc. are required since the initiation of image formation till the actual initiation of exposure to light, and a delay of, for example, several seconds is involved. Therefore, the first printout time can be shortened by setting the first reference speed so that the scanner motor can be accelerated to the speed in the beam-scan mode within the delay of several seconds since the arrival at this first reference speed. Besides, in the case where the scanner motor has not arrived at the first reference speed within the first term and where it has arrived at the second reference speed after the first term, it can be judged that the scanner motor is in a low acceleration state on account of a low temperature. Thus, the image formation process can be initiated at an appropriate timing in accordance with the temperature of the scanner motor. Accordingly, temperature detection means need not be separately provided, so that a configuration is simple, and a cost can be suppressed.

BRIEF DESCRIPTION OF THE DRAWINGS

Illustrative aspects of the invention may be more readily described with reference to the accompanying drawings.

DETAILED DESCRIPTION illustrative aspects of the present invention will be described with reference to FIGS. 1 through 8.

Figure 1:
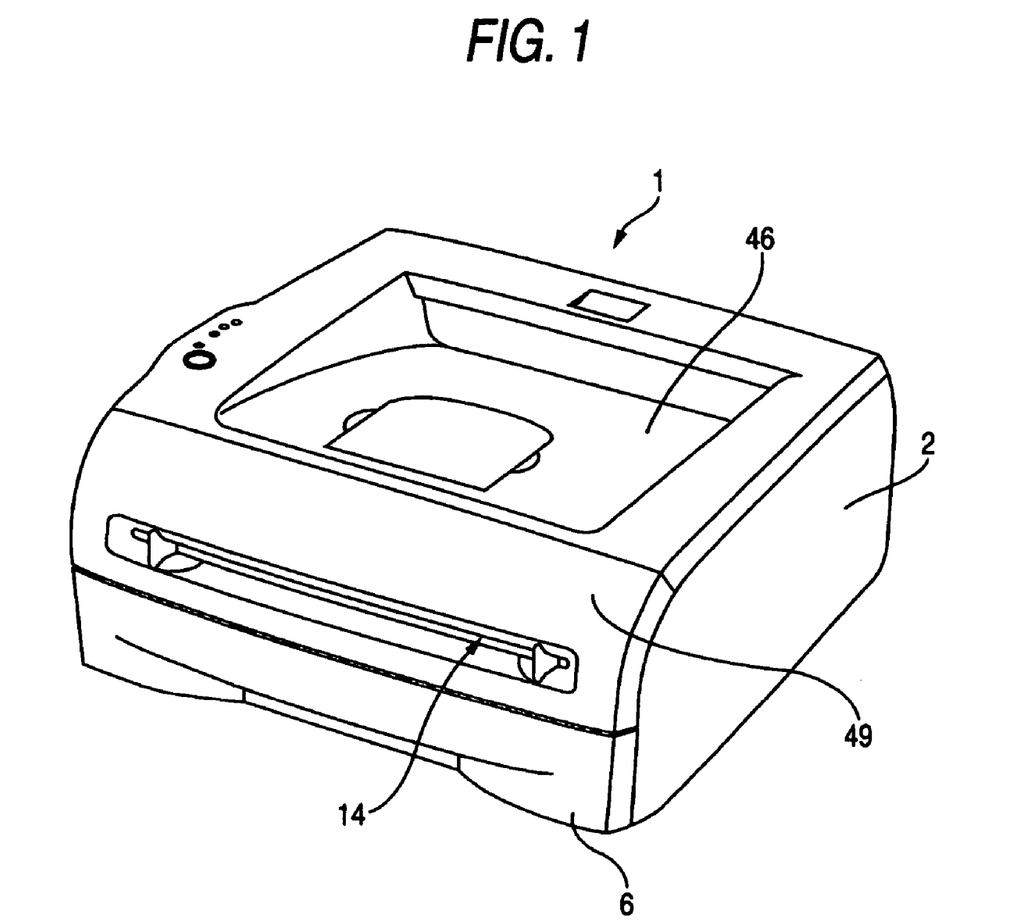
FIG. 1 is a perspective view showing a laser printer according to illustrative aspects of the present invention.
Figure 2:
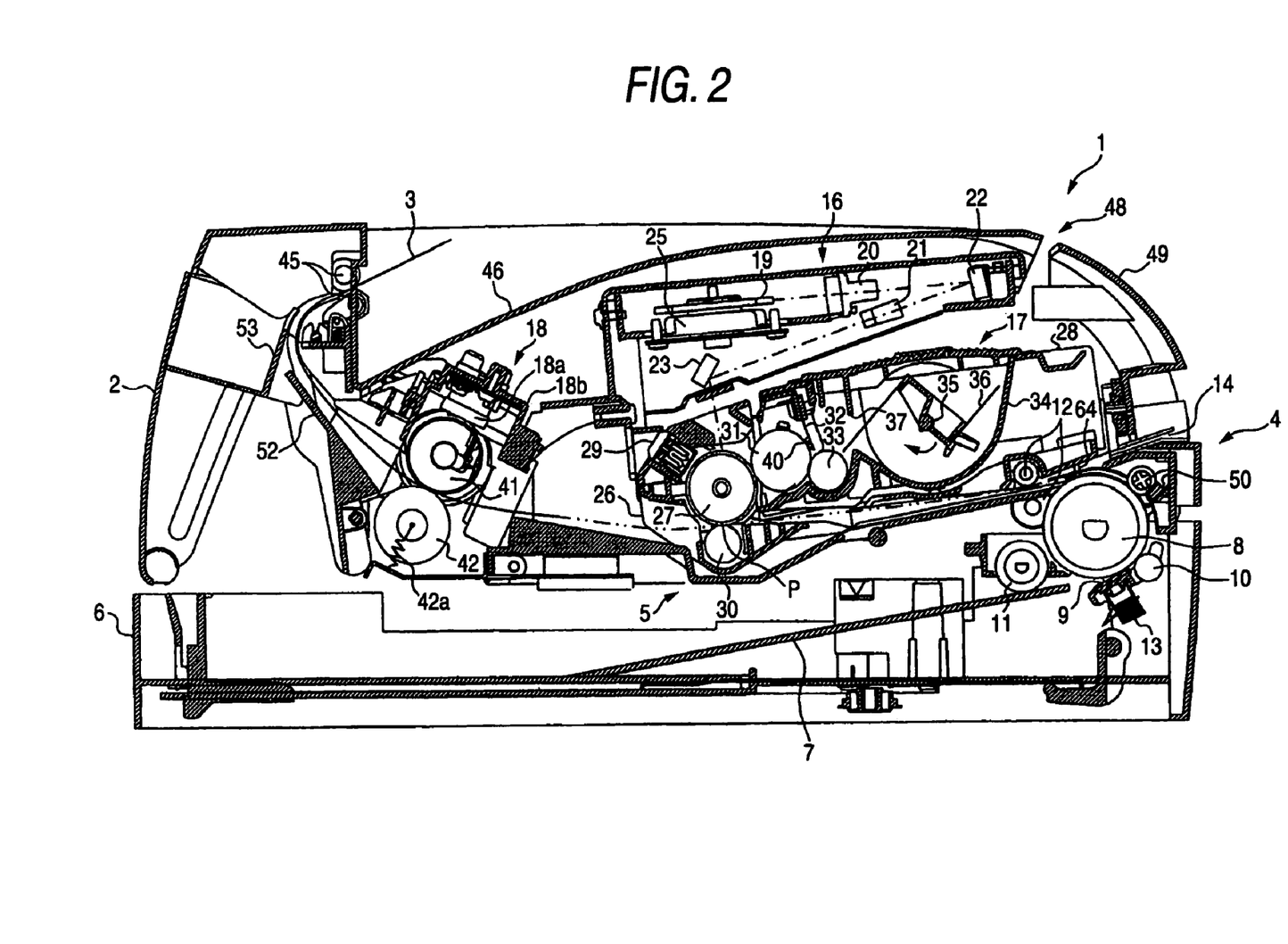
FIG. 2 is a schematic side sectional view of the laser printer.

First, a general configuration will be described with reference to FIGS. 1 and 2. FIG. 1 is a perspective view showing a laser printer 1 (hereinbelow, also simply termed "printer 1") which is an example of an image forming apparatus. Besides, FIG. 2 is a side sectional view of the essential portions of the printer 1. By the way, in FIG. 2, the printer 1 is seen in the axial directions of various rollers to be stated later, and the right side and left side of this figure shall be respectively called "front side" and "rear side".

<General Configuration>

As shown in FIG. 1, the printer 1 is provided with a body casing 2, in which a feeder section 4 for feeding a sheet of paper 3, an image formation section 5 for forming a predetermined image on the fed sheet of paper 3, and so forth, are included as shown in FIG. 2. Besides, as shown in FIGS. 1 and 2, a paper discharge tray 46 which is used for holding the sheet of paper 3 formed with the image by the printer 1 and then discharged is disposed at the upper part of the printer 1.

A wall of the body casing 2 on one side thereof is formed with an attachment/detachment opening 48 for attaching or detaching a process unit 17, and a front cover 49 for opening or closing the attachment/detachment opening 48 is disposed. The front cover 49 is rotatably supported on a cover shaft (not shown) which is inserted through the lower end part of this front cover. Thus, when the front cover 49 is closed around the cover shaft, the attachment/detachment opening 48 is closed by the front cover 49 as shown in FIGS. 1 and 2. On the other hand, when the front cover 49 is opened (inclined down) with the cover shaft as a fulcrum, the attachment/detachment opening 48 is opened, and the process unit 17 can be attached to or detached from the body casing 2 through the attachment/detachment opening 48.

As shown in FIG. 2, the feeder section 4 includes a paper feed tray 6, a sheet-of-paper presser plate 7 which is disposed in the paper feed tray 6, a pickup roller 11 which is disposed over the end part of the paper feed tray 6 on one end side thereof, a paper feed roller 8 as well as a separation pad 9, a pinch roller 10 which opposes to the paper feed roller 8, a paper-powder removal roller 50, and registration rollers 12 which are disposed on the downstream side of the sheet of paper 3 in the conveyance direction thereof, relative to the paper-powder removal roller 50.

The paper feed tray 6 is detachably mounted at a bottom part within the body casing 2, and it is used in order to stack and accommodate the sheets of paper 3 therein. This paper feed tray 6 is pulled out to the front side of the printer 1 (to the right side in FIG. 2) in cases of resupplying the sheets of paper 3 into this tray, etc. On this occasion, the feeder section 4 is separated between the paper feed roller 8 and the separation pad 9, and the pinch roller 10, the separation pad 9, and a spring 13 disposed on the rear side of the separation pad 9 are pulled out unitarily with the paper feed tray 6.

The sheet-of-paper presser plate 7 is swingably supported at its end part remote from the paper feed roller 8, whereby its end part nearer to the paper feed roller 8 is movable in an up and down direction, and it is urged upwards by a spring not shown. Therefore, as the stacked quantity of the sheets of paper 3 increases, the sheet-of-paper presser plate 7 is swung downwards against the urging force of the spring with a fulcrum at the end part thereof remote from the paper feed roller 8.

Figure 3:
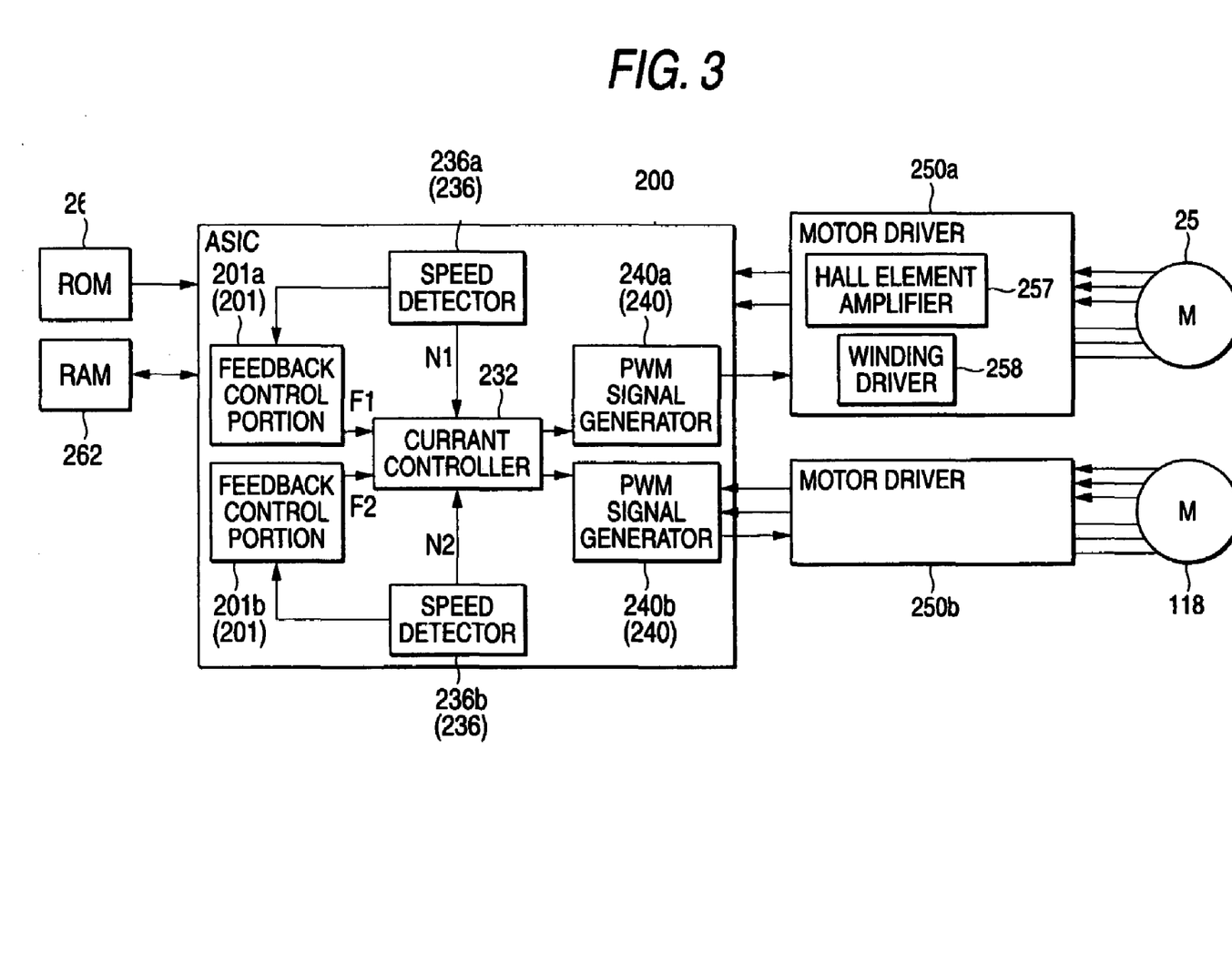
FIG. 3 is a block diagram conceptually showing the configuration of a motor drive device.
Figure 4:
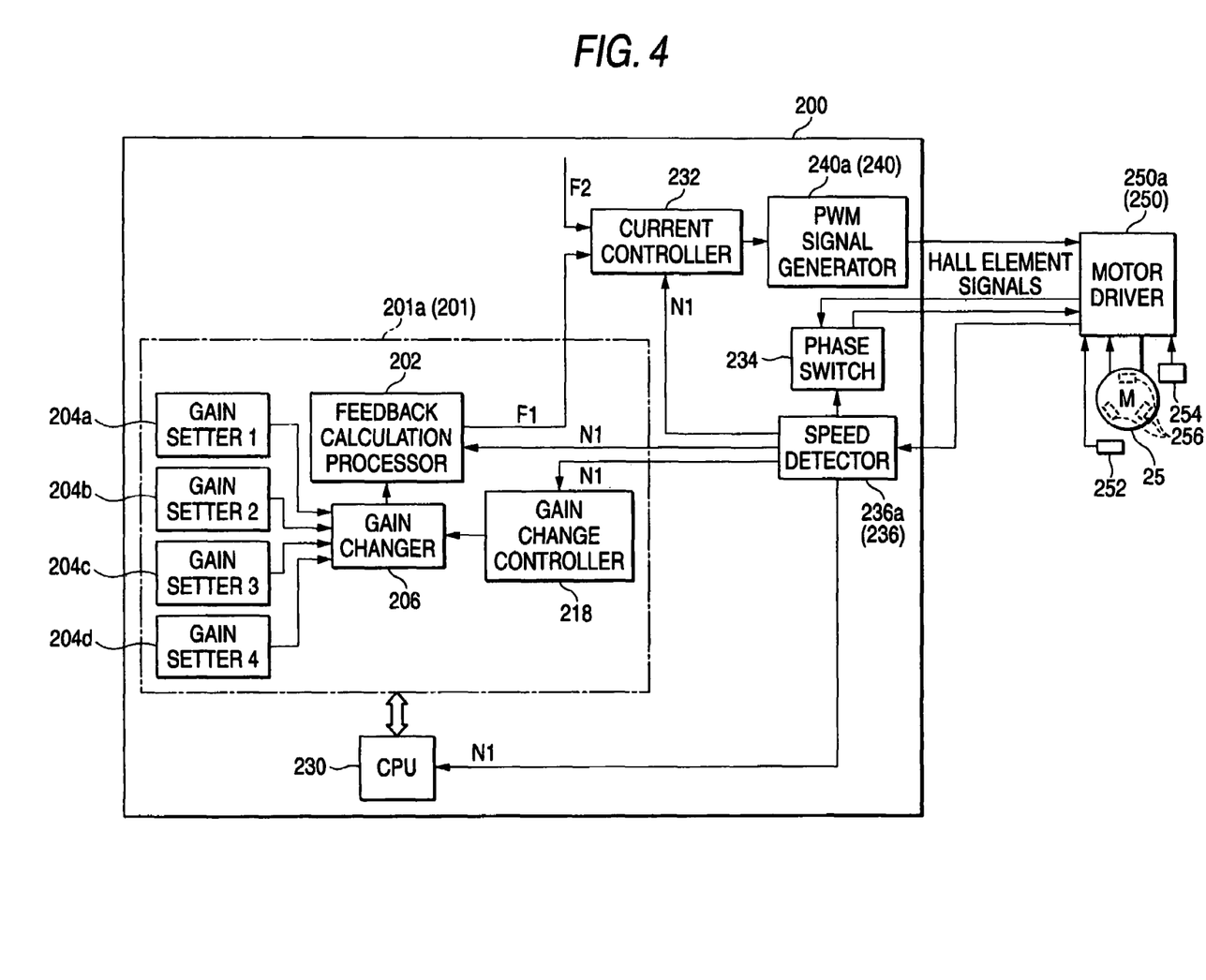
FIG. 4 is an explanatory diagram for chiefly explaining a part of a motor drive device which drives a scanner motor.

The pickup roller 11 is set so as to abut on the sheet of paper 3 stacked at the uppermost position within the paper feed tray 6 by the sheet-of-paper presser plate 7, and it delivers the sheet of paper 3 to a position at which this sheet of paper is conveyable by the paper feed roller 8 (the position between the paper feed roller 8 and the separation pad 9). Incidentally, the pickup roller 11 and the paper feed roller 8 are configured so as to be driven and rotated by power outputted from a main motor 118 (FIG. 3), and the drive for the rotation is initiated when a sheet-of-paper pickup signal P3 has been outputted from a CPU 230 (FIG. 4).

The separation pad 9 is disposed at a position opposing to the paper feed roller 8. Besides, the separation pad 9 is urged toward the paper feed roller 8 by the spring 13 which is disposed on the back side of this separation pad 9. Further, the separation pad 9 has the function of preventing the plurality of sheets of paper 3 from being supplied into a conveyance path in a stacked state. More specifically, the sheet of paper 3 delivered by the pickup roller 11 touches the paper feed roller 8 and the separation pad 9. On this occasion, an appropriate frictional force is applied between the separation pad 9 and the sheet of paper 3. Therefore, even when the plurality of sheets of paper 3 have been delivered to the separation pad 9 by the pickup roller 11, the sheets of paper 3 except the sheet of paper 3 at the uppermost position are stopped in engagement by the separation pad 9. Consequently, the sheets of paper 3 are fed from the paper feed roller 8 one by one. Besides, the sheet of paper 3 fed by the paper feed roller 8 is removed its paper powder by the paper-powder removal roller 50, and it is thereafter conveyed to the registration rollers 12.

The registration rollers 12 consist of a pair of rollers, and their drive and stop operations are controlled by a control device arranged in a circuit board (not shown), on the basis of sense timings based on a sheet-of-paper position sensor 64 which is arranged in the vicinity of the paper feed roller 8. Besides, owing to the control, the oblique advance of the sheet of paper 3 is corrected. More specifically, the control device holds the registration rollers 12 in a driven state while the sheet of paper 3 is being conveyed by the paper feed roller 8, and it stops the registration rollers 12 when the sheet-of-paper position sensor 64 has sensed the leading end of the sheet of paper 3. Besides, about the time when the sheet of paper 3 has touched the registration rollers 12 and has turned into a loose state, the control device drives the registration rollers 12 again so as to convey the sheet of paper 3 to an image formation position P based on the image formation section 5. Incidentally, the sheet-of-paper position sensor 64 is of mechanical type, and it is configured so that a sheet-of-paper sense signal P4 may be outputted when a sense portion protruding into the conveyance path of the sheet of paper 3 is displaced by its touch with the sheet of paper 3.

Besides, a hand-insertion paper feed port 14 for directly feeding the sheet of paper 3 from the front side of the printer 1 to the position of the registration rollers 12 is formed somewhat above the paper feed roller 8, so that the sheet of paper 3 can be fed to the conveyance path without accommodating the sheet of paper 3 in the paper feed tray 6.

The image formation section 5 functions as an image formation unit, and it includes a scanner unit 16, the process unit 17, a fixing unit 18, etc.

The scanner unit 16 is disposed at an upper part within the body casing 2, and it includes a laser beam emission portion (not shown), a polygon mirror 19 which is driven to rotate by a scanner motor 25, lenses 20 and 21, reflectors 22 and 23, etc. As indicated by a dot-and-dash line in FIG. 2, a laser beam which is emitted from the laser beam emission portion and which is based on predetermined image data is passed through or reflected by the polygon mirror 19, lens 20, reflector 22, lens 21 and reflector 23 in the order mentioned, thereby to be projected onto the surface of a photosensitive drum 27 in the process unit 17 by high-speed scan. Incidentally, the laser beam emission portion is configured so as to emit the laser beam when a print signal P5 has been outputted by the CPU 230 (FIG. 4).

The process unit 17 is disposed under the scanner unit 16, and it is detachably attached to the body casing 2 in a substantially horizontal direction and in a front and rear direction (a left and right direction in FIG. 2) Besides, the process unit 17 is constituted by a drum cartridge 26 and a development cartridge 28.

The drum cartridge 26 includes the photosensitive drum 27, a scolotron type electric charger 29, and a transfer roller 30.

The development cartridge 28 includes a development roller 31, a layer-thickness regulation blade 32, a toner supply roller 33, a toner box 34, etc. Besides, the development cartridge 28 is detachably attached to the drum cartridge 26.

Besides, a toner (developer) is packed in the toner box 34. Further, the toner in the toner box 34 is stirred by the rotation of an agitator 36 in the direction of arrow (clockwise direction), and the agitator 36 is supported on a rotary shaft 35 disposed centrally of the toner box 34. Thus, the toner is released through a toner supply port 37 provided in the toner box 34.

At a position sideward of the toner supply port 37, the toner supply roller 33 is disposed so as to be rotatable in a counterclockwise direction. Besides, the development roller 31 is disposed in opposition to the toner supply roller 33 so as to be rotatable in the counterclockwise direction. Further, the toner supply roller 33 and the development roller 31 are held in abutment on each other in a state where they are respectively compressed to some extent.

The toner supply roller 33 is such that a metal-made roller shaft is covered with a roller which is made of an electrically-conductive foamed material. Besides, the development roller 31 is such that a metal-made roller shaft is covered with a roller which is made of an electrically-conductive rubber material having no magnetic property. More concretely, the roller part of the development roller 31 is such that the surface of a roller body which is made of electrically-conductive urethane rubber or silicone rubber containing carbon particles or the likes is covered with a coat layer of urethane rubber or silicone rubber in which fluorine is contained. Incidentally, a development bias is applied to the development roller 31.

Besides, the layer-thickness regulation blade 32 is disposed in the vicinity of the development roller 31. This layer-thickness regulation blade 32 includes a pressing portion 40 of semicircular section made of insulating silicone rubber, at the distal end part of a blade body made of a metallic leaf spring member. Besides, the layer-thickness regulation blade 32 is supported by the development cartridge 28 near the development roller 31, and it is configured so that the pressing portion 40 may be held in pressed touch with the surface of the development roller 31 by the elastic force of the blade body.

Besides, the toner released through the toner supply port 37 is supplied onto the development roller 31 by the rotation of the toner supply roller 33. On this occasion, the toner is frictionally charged in the positive polarity between the toner supply roller 33 and the development roller 31. Further, the toner supplied onto the development roller 31 is advanced into the interspace between the development roller 31 and the pressing portion 40 of the layer-thickness regulation blade 32, with the rotation of the development roller 31, and it is further frictionally charged sufficiently here, whereupon it is borne on the development roller 31 as a thin layer of predetermined thickness.

The photosensitive drum 27 is disposed at a position sideward of the development roller 31 so as to be rotatable clockwise in a state where it opposes to the development roller 31. This photosensitive drum 27 is such that a drum body is grounded, and that its surface part is formed of a positively-charging photosensitive layer which is made of polycarbonate or the like. Besides, the photosensitive drum 27 is configured so as to be driven and rotated by power outputted from the main motor 118 (FIG. 3) when the print signal P5 has been outputted by the CPU 230 (FIG. 4).

The scolotron type charger 29 is disposed at a predetermined interval from the photosensitive drum 27 so as not to touch this drum. This scolotron type charger 29 is arranged about 30 degrees above a horizontal direction in the radial direction of the photosensitive drum 27. Besides, the scolotron type charger 29 is a positively-charging one which generates a corona discharge from charging wire of tungsten or the like, and it is configured so as to charge the surface of the photosensitive drum 27 uniformly in the positive polarity.

Besides, the surface of the photosensitive drum 27 is first positively charged uniformly by the scolotron type charger 29, with the rotation of this photosensitive drum 27. Thereafter, the surface of the photosensitive drum 27 is exposed to light by the high-speed scan accompanying the turn-ON and turn-OFF of the laser beam from the scanner unit 16 on the basis of the image data externally inputted, and it is formed with an electrostatic latent image based on the image data.

Subsequently, when the toner which is borne on the development roller 31 and which is positively charged opposes to and touches the photosensitive drum 27 by the rotation of the development roller 31, it is supplied to the electrostatic latent image formed on the surface of the photosensitive drum 27, that is, to those exposed parts of the surface of the photosensitive drum 27 positively charged uniformly which have been exposed to the light by the laser beam and whose potentials have lowered. Then, the toner is selectively borne to visualize the image, whereby a reversal development is achieved.

The transfer roller 30 is arranged so as to oppose to the photosensitive drum 27 under this photosensitive drum 27, and it is supported by the drum cartridge 26 so as to be rotatable counterclockwise. This transfer roller 30 is configured in such a way that a metal-made roller shaft is covered with a roller which is made of an ionically-conductive rubber material, and that a transfer bias (transferring forward bias) is applied during the transfer. Therefore, the visible image borne on the surface of the photosensitive drum 27 is transferred onto the sheet of paper 3 while this sheet of paper 3 passes through the interspace between the photosensitive drum 27 and the transfer roller 30.

The fixing unit 18 is disposed on the downstream side in the conveyance direction of the sheet of paper (on the rear side of the printer) with respect to the process unit 17, and it includes a heating roller 41 formed with a gear, a pressing roller 42 for pressing the heating roller 41, and a thermostat 18a. Besides, the heating roller 41 and the thermostat 18a are covered with a cover 18b.

The heating roller 41 is a cylindrical member made of a metal, and it includes therein a halogen lamp for heating.

Disposed below the pressing roller 42 is a spring 42a which rotatably presses (urges) this pressing roller 42 from below toward the axis of the heating roller 41. Besides, the pressing roller 42 is configured so as to come into close touch with the heating roller 41 or the sheet of paper 3 and to be rotated in accordance with the rotational drive of the heating roller 41.

The thermostat 18a is formed of, for example, a bimetal, and it turns ON/OFF the power source of the heater for heating the heating roller 41, in accordance with heat generated from the heating roller 41, whereby the heating roller 41 is prevented from being heated to an abnormal high temperature.

The cover 18b has a shape in which the side and upper parts of the heating roller 41 are concealed in order that the heat generated from the heating roller 41 may be emitted out of the fixing unit 18 so as not to adversely affect the other devices (for example, the scanner unit 16) inside the body casing 2. Here, the cover 18b supports the pressing roller 42, only at the center shaft thereof (not shown) so as to be movable in the urging direction of the spring 42a and to be rotatable, and the lower half of the pressing roller 42 is exposed out of this cover 18b.

In such a fixing unit 18, the heating roller 41 heats and presses the toner transferred onto the sheet of paper 3 in the process unit 17, while the sheet of paper 3 passes through the interspace between the heating roller 41 and the pressing roller 42, whereby the image is fixed on the sheet of paper 3. Further, the heating roller 41 conveys the sheet of paper 3 subjected to the image fixation, to ejection rollers 45 through a paper ejection path which is formed by guide members 52 and 53. Besides, the ejection rollers 45 eject the conveyed sheet of paper 3 onto the paper ejection tray 46.

Besides, in the printer 1, circuit boards in which control devices for the drive controls of the various rollers, the polygon mirror 19, etc., are mounted are arranged on both the sides of the conveyance path along which the sheet of paper 3 is conveyed (at positions between which the process unit 17 is held sideward).

<Configuration of Motor Drive Device>

1. General Configuration

Next, there will be described a motor drive device which drives the scanner motor 25 and the main motor 118. FIG. 3 is a block diagram conceptually illustrating the general configuration of the motor drive device. Besides, FIG. 4 is a block diagram showing the configuration of a feedback control portion 201a (201) in order to chiefly explain that part of the motor drive device which drives the scanner motor 25. Incidentally, only elements corresponding to the scanner motor 25 (a speed detector 236a, the feedback control portion 201a, a PWM signal generator 240a, a phase switch 234, etc.) are exemplified in FIG. 4, but a speed detector 236b, a phase switch (not shown), a feedback control portion 201b, and a PWM signal generator 240b which are respectively similar to the above are also disposed for the main motor 118.

As shown in FIG. 3, the motor drive device is configured including an ASIC 200, and two motor drivers 250a and 250b. The ASIC 200 and the motor drivers 250a and 250b are respectively provided in separate circuit boards. The ASIC 200 corresponds to a control circuit, and it is configured so as to be capable of digital inputs/outputs and to execute digital processing. On the other hand, the motor drivers 250a and 250b are configured so as to drive the scanner motor 25 and the main motor 118' on the basis of digital signal outputs from the ASIC 200, respectively. Besides, the CPU 230 is disposed in the ASIC 200 as shown in FIG. 4, and storage means, such as a ROM 260 and a RAM 262, are externally connected to the ASIC 200. Incidentally, various programs which are run in the printer 1 (including a program which executes the post-start process of the scanner motor 25) are stored in the ROM 260.

Besides, as shown in FIGS. 3 and 4, the ASIC 200 is provided with the speed detectors 236a and 236b, the phase switches 234, the feedback control portions 201a and 201b, and the PWM signal generators 240a and 240b in correspondence with the respective motors. Incidentally, the speed detectors 236a and 236b shall also be generally termed "speed detector 236", and the feedback control portions 201a and 201b shall also be generally termed "feedback control portion 201".

2. Speed Detector

The scanner motor 25 is provided with an FG (Frequency Generator) signal generator 252 as a speed information detection unit. The FG signal generator 252 is configured including an FG pattern which is formed on the circuit board, and a magnet which is disposed on the rotor substrate side of the scanner motor 25. Owing to the FG pattern and the magnet, a signal which has a waveform corresponding to a rotational frequency is inputted to the motor driver 250a. The motor driver 250a amplifies the signal from the FG signal generator 252 and converts the amplified signal into a digital signal, whereupon the digital signal is outputted to the ASIC 200 as an FG (Frequency Generator) signal (corresponding to "speed information") in a waveform which corresponds to a rotational speed. On the other hand, the speed detector 236 in the ASIC 200 is configured so as to be capable of detecting the rotational speed of the scanner motor 25 on the basis of the FG signal.

Besides, the scanner unit 16 (FIG. 2) is provided with a BD (Beam Detector) sensor 254 which is configured so as to be capable of detecting the laser beam reflected by the polygon mirror 19, and which can be employed as the a speed information detection unit of the scanner motor 25 as is separate from the FG signal generator 252. The BD sensor 254 is usually employed for adjusting the write timing of every line by a laser, and it is configured so as to detect reflected light when the polygon mirror has become a predetermined angle. By way of example, in a case where the polygon mirror employed has six facets, the reflected lights are detected six times per revolution. Besides, an output corresponding to the detections of the reflected lights is inputted from the BD sensor 254 to the motor driver 250a, and it is converted into a digital signal in the motor driver 250a, whereupon the digital signal is outputted to the ASIC 200 as a BD signal (corresponding to "speed information") in a waveform corresponding to a rotational speed. Owing to such a configuration, the speed detector 236a in the ASIC 200 can detect the rotational speed of the scanner motor 25 on the basis of the BD signal.

As described above, the FG signal and the BD signal are respectively inputted to the ASIC 200, and the speed detector 236a detects the rotational speed of the scanner motor 25 on the basis of, at least, either of these signals. Here, in general, in order to prevent a photosensitive member from deteriorating due to laser projection, the detection of the BD signal (the projection of the laser) is not performed in a state where the rotational speed of the scanner motor 25 is low.

Therefore, in a case where the rotational speed of the scanner motor 25 is at or below a predetermined speed (that is, in a case where the rotational speed of the polygon mirror 19 is at or below a predetermined speed), the FG signal is adopted as the signal for the speed detection, and in a case where the rotational speed exceeds a predetermined speed, the BD signal is adopted. By way of example, a reference rotational speed for distinguishing a start state and a steady state can be employed as the predetermined speed. On this occasion, the FG signal is used in the start state, and the BD signal is used in the steady state. The rotational speed of the scanner motor 25 thus detected is employed for processes to be stated later (such as a speed-command-value calculation process in a feedback calculation processor 202, a gain change process in a gain change controller 218, a phase switching process in the phase switch 234, and first and second judgment processes in the CPU 230). Besides, only the BD signal can be utilized if the deterioration of the photosensitive member is not taken into consideration, and only the FG signal may well be utilized.

Incidentally, as stated above, the speed detector 236b is disposed in correspondence with the main motor 118 (refer to FIG. 3) though the speed detector 236a corresponding to the scanner motor 25 has been described with reference to FIG. 4. However, the main motor 118 is not provided with any BD sensor though it is provided with the similar FG signal generator (not shown), so that the rotational speed of the main motor 118 is detected on the basis of the FG signal.

3. Phase Switch

Besides, as shown in FIG. 4, the scanner motor 25 is provided with three Hall elements 256. The Hall elements 256 are configured so as to deliver outputs in accordance with the positions of the rotor of the scanner motor 25, and the outputs from the Hall elements 256 are inputted to the motor driver 250a. In the motor driver 250a, the outputs from the Hall elements 256 are amplified by a Hall element signal amplifier 257 (refer to FIG. 3), and the amplified signals are converted into digital signals by an A/D converter not shown. Besides, the resulting digitized Hall element signals are outputted to the ASIC 200.

Each of the Hall element signals is a signal in a waveform in which the rotational position of the rotor of the scanner motor 25 can be specified. The Hall element signal is inputted to the ASIC 200 through the motor driver 250a, whereby the rotational position of the rotor (the rotational position of the rotor relative to the stator of the scanner motor 25) can be grasped within the ASIC 200.

Besides, as shown in FIG. 4, in the ASIC 200, while the position of the rotor is being grasped on the basis of the inputted Hall element signal, the phase switching timing of the scanner motor 25 is determined, and a digital signal (phase switching signal) based on the determined phase switching timing is outputted to the motor driver 250a which drives the scanner motor 25.

The scanner motor 25 is constructed as a three-phase motor, the winding of which is a three-phase star connection though not shown. On the other hand, the Hall elements 256 are arranged at equal intervals (of, for example, 120°) around the rotor of the scanner motor 25, and the Hall element signals from all the Hall elements 256 are respectively inputted to the ASIC 200. Upon detecting the rise or fall of the Hall element signal, the phase switch 234 generates and outputs a phase switching signal so that a winding current which excites any two of three phases (U-phase, V-phase and W-phase) in polarities opposite to each other may flow. Besides, switching which corresponds to the phase switching signal is effected in the winding driver 258 of the motor driver 250a (FIG. 3).

4. Feedback Control Portion

Besides, as shown in FIG. 4, the ASIC 200 is provided with the feedback control portion 201a corresponding to the scanner motor 25, and the feedback control portion 201b corresponding to the main motor 118. Both the feedback control portions 201 have substantially the same configurations, and they are configured so as to calculate controlled variables (speed command values) F1 and F2 corresponding to the respective motors. Here, the feedback control portion 201a corresponding to the scanner motor 25 will be described by way of example.

As shown in FIG. 4, the feedback control portion 201a includes a gain changer 206, the gain change controller 218 and the feedback calculation processor 202. The gain change controller 218 outputs a change command conforming to a predetermined set condition, to the gain changer 206, and the gain changer 206 selects a gain complying with the change command, from among set values in a plurality of gain setters 204a, 204b, 204c and 204d. The gain setters 204a, 204b, 204c and 204d are configured so as to hold the set values in selectable states, and the set value held in any of the gain setters is selected by the gain changer 206.

The gain change controller 218 is configured so that the gain changer 206 may be caused to output a selection command for selecting any gain on the basis of the rotational situation of the scanner motor 25. Concretely, when the scanner motor 25 has started rotating from its stopped state, the gain changer 206 outputs a selection command for selecting a starting gain, until a predetermined steady state is established. Besides, when the steady state has been established, the gain changer 206 outputs a selection command for selecting a steady-state gain different from the starting gain.

Figure 5:
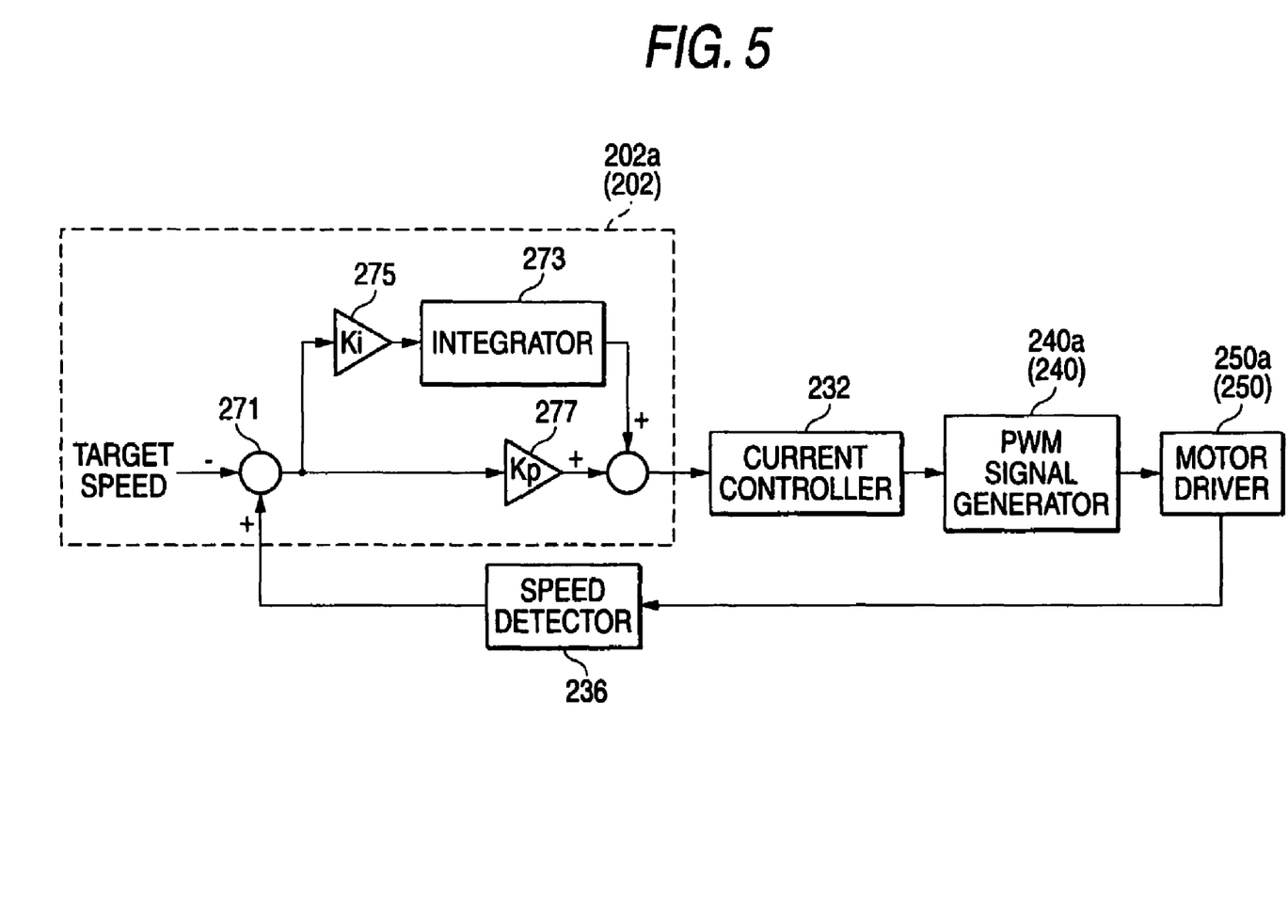
FIG. 5 is an explanatory diagram for explaining the internal configuration and connected parts of a feedback control portion.

FIG. 5 is a block diagram conceptually showing the internal configuration of the feedback calculation processor 202, and the states of the connections of the feedback calculation processor 202 with other elements. In the feedback calculation processor 202 (corresponding to "feedback calculation means"), the controlled variable (speed command value) of the scanner motor 25 is determined on the basis of the gain selected by the gain changer 206, and the present rotational speed of the scanner motor 25 as is detected by the speed detector 236.

In this example structure, the feedback calculation processor 202 includes a subtractor 271 which obtains the speed deviation between a target speed and the present rotational speed detected by the speed detector 236. Besides, it includes an integral calculator 275 which multiplies the speed deviation by an integral gain, and an integrator 273 which obtains the integral value of calculated values based on the integral calculator 275, thereby to compute an integral control value. Also, it includes a proportion calculator 277 which multiplies the speed deviation by a proportional gain, thereby to compute a proportional control value. Here, the sum between the integral control value and the proportional control value is computed as the controlled variable (speed command value). The controlled variable (speed command value) is inputted to a current controller 232. Incidentally, regarding the proportional gain for use in the proportion calculator 277 and the integral gain for use in the integral calculator 275, a starting proportional gain or a steady-state proportional gain and a starting integral gain or a steady-state integral gain, which are selected by the gain changer 206, are used according to circumstances.

Besides, the calculated controlled variable (speed command value) is inputted to the current controller 232 and is suppressed depending upon a condition. Letting A2 denote a current value which is supplied to the scanner motor 25, and B2 denote a current value which is supplied to the main motor 118, the current controller 232 performs the control of a supply current (concretely, the control of the speed command value which is outputted to each PWM signal generator) so that an added current value E obtained by adding the current values A2 and B2 may become, at most, the maximum supply current value D from power source means. Concretely, in a case where a large current is being supplied to the scanner motor 25 (for example, in a term after the initiation of the start), the current value B2 which is supplied to the main motor 118 is suppressed to be smaller than the maximum current value B1 which can be supplied to the main motor 118.

Thereafter, the controlled variable (speed command value) is inputted to the PWM signal generator 240a. Besides, a PWM signal based on the speed command value, or a PWM signal based on the speed command value suppressed by the current controller 232, is generated in the PWM signal generator 240a and is outputted to the motor driver 250a as a speed control signal (digital signal). The motor driver 250a drives the scanner motor 25 in accordance with the PWM signal (speed control signal).

<Post-Start Process of Scanner Motor>

Figure 6:
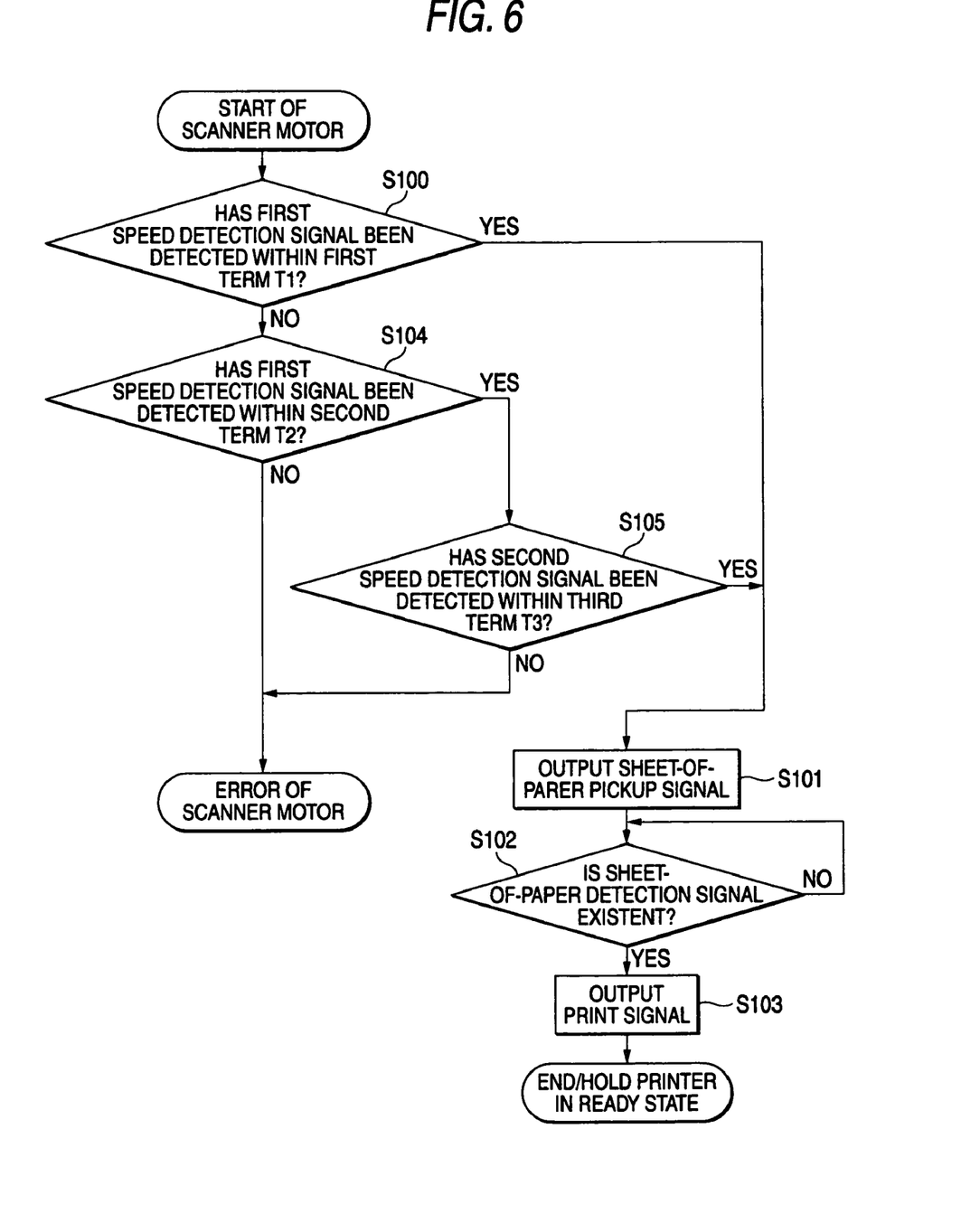
FIG. 6 is a flow chart showing the flow of the post-start process of the scanner motor.

Next, there will be described the flow of a process (termed "scanner-motor post-start process") in the CPU 230 as proceeds in a case where the scanner motor 25 starts being driven from its stopped state when a print command, for example, has been received. Incidentally, as will be stated below, the CPU 230 functions as a first judgment unit, a second judgment unit, a third judgment unit and a fault decision unit, and it further functions as a timer for keeping an elapsed time since the initiation of the start of the scanner motor 25.

Figure 7:
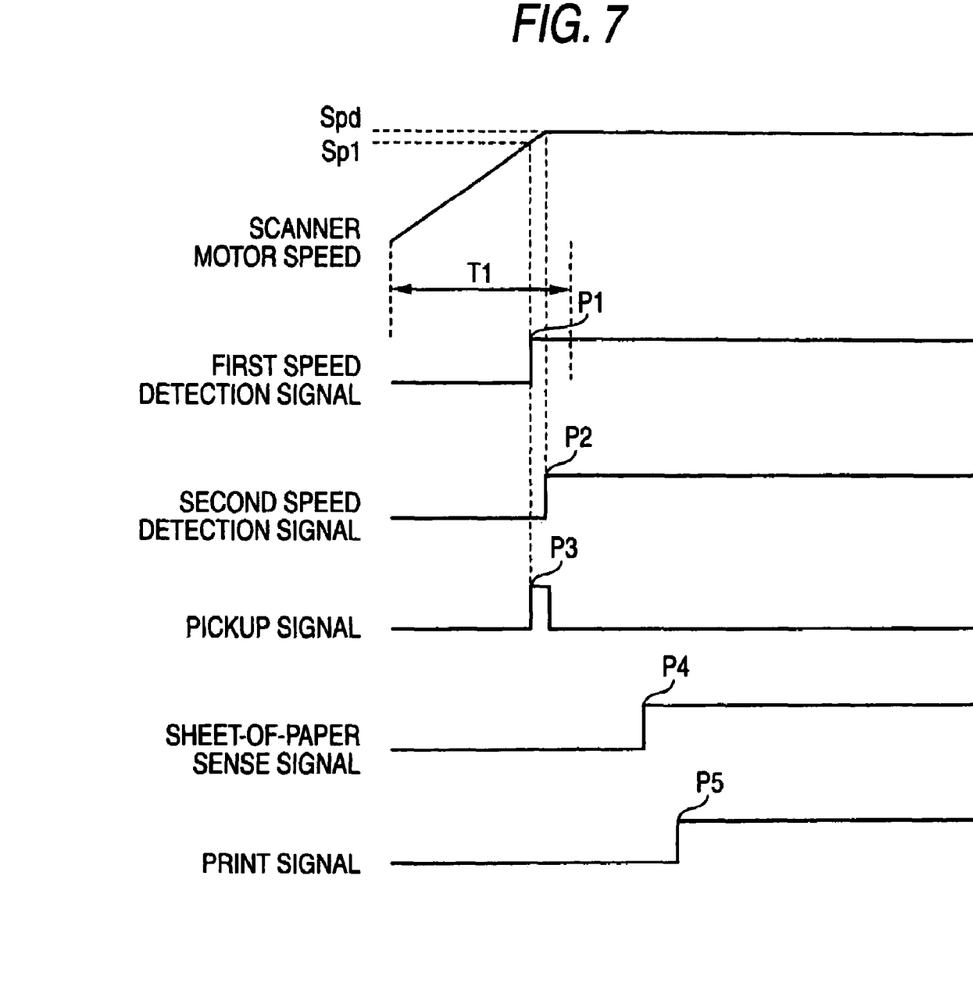
FIG. 7 is a timing chart for explaining the relationship among the rotational speed of the scanner motor and the input/output timings of individual signals at a normal temperature.
Figure 8:
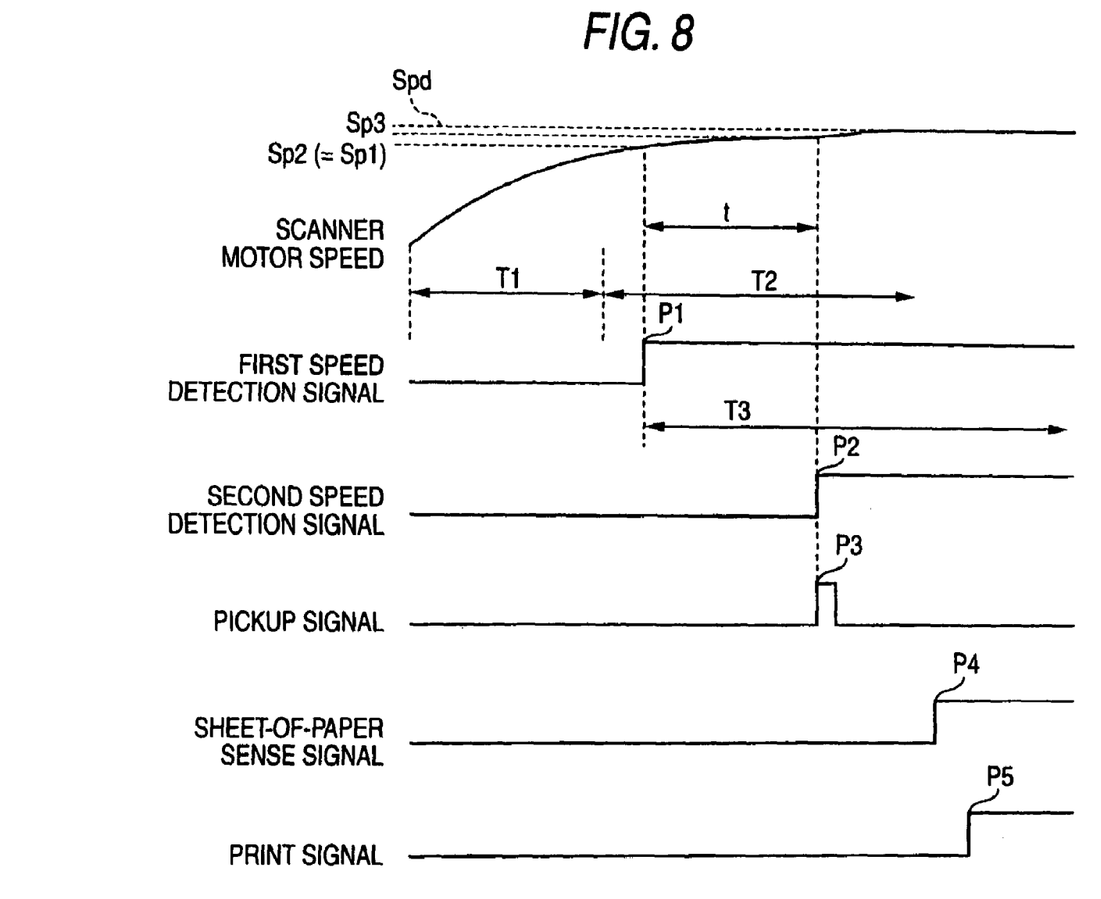
FIG. 8 is a timing chart for explaining the relationship among the rotational speed of the scanner motor and the input/output timings of the individual signals at a low temperature.

FIG. 6 shows an example of a flow chart for explaining the flow of the control of the scanner-motor post-start process which the CPU 230 executes in accordance with a program recorded in the ROM 260. Besides, FIGS. 7 and 8 show examples of timing charts for explaining the relationships among the rotational speed (rpm) of the scanner motor 25 and the input/output timings of individual signals. In each of the timing charts, the axis of abscissas represents the time, and the axis of ordinates represents the rotational speed or the existence or nonexistence of the signals. Here, the timing chart in FIG. 7 corresponds to a case where the scanner motor 25 has been started at a normal temperature, while the timing chart in FIG. 8 corresponds to a case where the scanner motor 25 has been started at a low temperature. As seen from both the figures, the scanner motor 25 is accelerated more gradually in the case of the low-temperature start, than in the case of the normal-temperature start.

When the drive of the scanner motor 25 is initiated, the timekeeping based on the timer is initiated in the CPU 230. Besides, as indicated in FIG. 6, whether or not a first speed detection signal P1 has been detected within a first term T1 since the initiation of the drive is judged on the basis of the timekeeping based on the timer, at a step S100 (first judgment process). Here, the first speed detection signal P1 is generated when the rotational speed of the scanner motor 25 has arrived at a first reference speed Sp1 (FIGS. 7 and 8). In this example structure, the rotational speed of the scanner motor 25 is monitored on the basis of a speed detection signal N1 from the speed detector 236a, in the CPU 230, and the first speed detection signal P1 is regarded as having been generated, in a case where the rotational speed coincides with or exceeds the first reference speed Sp1. Incidentally, the first speed detection signal P1 may well be generated by the speed detector 236a and outputted to the CPU 230. Besides, the first reference speed Sp1 is set at a value which is smaller than the target rotational speed Spd of the scanner motor 25 in the beam-scan mode. In this example structure, the first reference speed Sp1 is set at a value which is 92% of the rotational speed Spd. By way of example, in a case where the rotational speed Spd in the beam-scan mode is 30000 rpm, the first reference speed Sp1 is set at 27600 rpm. The first reference speed Sp1 is a speed at which, when the pickup of the sheet of paper is initiated at the arrival at this speed, the scanner motor 25 is considered to arrive at the speed in the beam-scan mode, before the exposure of the photosensitive drum 27 to light is initiated. This is based on the fact that, as shown in FIG. 7, the scanner motor 25 is rectilinearly accelerated at the normal temperature, so this speed is easily anticipated to some extent. Besides, the first term T1 is a term in which the scanner motor 25 is considered to arrive at the first reference speed Sp1 at the normal temperature. This first term T1 is employed for judging whether or not the scanner motor 25 is being normally driven at the normal temperature, and it is set at, for example, 3.5 seconds.

In a case where the first speed detection signal P1 has been detected within the first term T1 (that is, in a case where the rotational speed of the scanner motor 25 has arrived at the first reference speed Sp1 within the first term T1), it is judged that the scanner motor 25 has been driven at the normal temperature. In this case, the routine advances to "Yes" at the step S100, and the sheet-of-paper pickup signal P3 is thereafter outputted at a step S101. When the sheet-of-paper pickup signal P3 is outputted, the drive of the pickup roller 11 as well as the paper feed roller 8 is initiated by the main motor 118, whereby the separation and conveyance of the sheet of paper 3 within the paper feed tray 6 are initiated. Subsequently, whether or not a sheet-of-paper sense signal P4 from the sheet-of-paper position sensor 64 exists is judged at a step S102. Besides, in a case where the sheet-of-paper sense signal P4 is existent, that is, in a case where the distal end of the sheet of paper 3 has been sensed by the sheet-of-paper position sensor 64, the print signal P5 is subsequently outputted at a predetermined timing at a step S103. When the print signal P5 is outputted, the projection of the laser beam by the laser beam emission portion, the drive of the photosensitive drum 27, etc. are initiated, and the image formation on the sheet of paper 3 is performed. By the way, in the case of the start of the scanner motor 25 at the normal temperature, as shown in FIG. 7, even when the conveyance of the sheet of paper 3 is initiated at the point of time at which the rotational speed of the scanner motor 25 has arrived at the first reference speed Sp1 smaller than the rotational speed Spd in the beam-scan mode, the scanner motor 25 has already arrived at the target rotational speed Spd about the time when the projection of the laser beam is initiated by the print signal P5. When an image formation process has been ended in this way, the laser printer 1 is held in a ready state until the scanner motor 25 is started again.

In a case where the first speed detection signal P1 has not been detected within the first term T1 (that is, in a case where the rotational speed of the scanner motor 25 has not arrived at the first reference speed Sp1 within the first term T1), the routine advances to "No" at the step S100, and whether or not the first speed detection signal P1 has been detected within a second term T2 is subsequently judged on the basis of the timekeeping based on the timer, at a step S104 (second judgment process). Here, the second judgment process judges whether or not the scanner motor 25 has arrived at a second reference speed Sp2 within the second term T2. In this example structure, the second reference speed Sp2 is set to be equal to the first reference speed Sp1, and hence, the arrival at the second reference speed Sp2 is judged by the detection of the first speed detection signal P1. However, both the reference speeds Sp1 and Sp2 can also be set at different values. In this case, the arrival at the second reference speed Sp2 may be judged by the detection of another speed detection signal corresponding to this speed Sp2. Besides, the second term T2 is a term which is initiated since the end of the first term T1, and it is set at, for example, 6.5 seconds.

In a case where the first speed detection signal P1 has been detected within the second term T2 (that is, in a case where the scanner motor 25 has arrived at the first reference speed Sp1 (=second reference speed Sp2) within the second term T2), it is judged that, since the scanner motor 25 has been started at the low temperature, it is in a low acceleration state. Here, although the scanner motor 25 has its speed raised rectilinearly at the normal temperature (refer to FIG. 7), its speed rise becomes in the shape of a curve at the low temperature. Since the curvature of the curve changes depending upon temperatures, a time period t (refer to FIG. 8) in which the scanner motor 25 arrives at the target rotational speed Spd in the beam-scan mode, since the arrival at the first reference speed Sp1, is liable to disperse. Therefore, when the conveyance of and the image formation on the sheet of paper 3 are immediately initiated as in the case of the normal temperature, the scanner motor 25 might fail to arrive at the rotational speed Spd before the projection of the laser beam is initiated from the laser beam emission portion. In this case, accordingly, the routine advances to "Yes" at the step S104, and whether or not a second speed detection signal P2 has been detected within a third term T3 is subsequently judged on the basis of the timekeeping based on the timer, at a step S105 (third judgment process). Here, the second speed detection signal P2 is generated when the rotational speed of the scanner motor 25 has arrived at a third reference speed Sp3, likewise to the first speed detection signal P1. The third reference speed Sp3 is set at a value which is greater than the first reference speed Sp1 and which is equal to or smaller than the rotational speed Spd in the beam-scan mode (that is, the relation of the "first reference speed Sp1<third reference speed Sp3≦rotational speed Spd in the beam-scan mode" holds). In this example structure, the third reference speed Sp3 is set at the value equal to the rotational speed Spd. Besides, the third term T3 is initiated at the point of time at which the first speed detection signal P1 has been detected, in this example structure, and it is set at, for example, 10 seconds.

In a case where the second speed detection signal P2 has been detected within the third term T3 (that is, in a case where the rotational speed of the scanner motor 25 has arrived at the third reference speed Sp3 within the third term T3), it is judged that the scanner motor 25 has arrived at a sufficient rotational speed. Therefore, the routine advances to "Yes" at the step S105, and the conveyance of and the image formation on the sheet of paper 3 are performed as in the case of the normal temperature at the steps S101-S103.

In a case where the first speed detection signal P1 is not detected within the second term T2, or where the second speed detection signal P2 is not detected within the third term T3, the fault of the scanner motor 25 is decided. In this case, the routine advances to "No" at the step S104 or S105, and an error process, for example, the display of error information or the stop of the scanner motor 25 is executed.

As described above, according to aspects of the invention, in the case where the scanner motor 25 has arrived at the first reference speed Sp1 within the first term T1 (S100: Yes), it can be judged that the scanner motor 25 is operating at the normal temperature. Also, in the case where the scanner motor 25 has not arrived at the first reference speed Sp1 within the term T1 (S100: No), and besides, where it has arrived at the second reference speed Sp2 after the first term T1 (S104: Yes), it can be judged that the scanner motor 25 is in the low acceleration state on account of the low temperature. Thus, the image formation process can be initiated at an appropriate timing, in accordance with the temperature of the scanner motor 25. Accordingly, any temperature detection means need not be separately provided, so that the configuration is simple, and the cost can be suppressed.

Besides, the second term T2 for judging whether or not the scanner motor 25 has arrived at the second reference speed Sp2 is stipulated in the second judgment process (S104), whereby if the scanner motor 25 is in the low acceleration state can be judged. Therefore, a process conforming to the state of the scanner motor 25 can be executed.

Besides, in the case where the scanner motor 25 has not arrived at the first reference speed Sp1 within the first term T1 (S100: No), whether the scanner motor 25 is in the low acceleration state or at fault can be judged depending upon whether or not the scanner motor 25 arrives at the second reference speed Sp2 within the second term T2 (S104). It is therefore preventable to erroneously sense the scanner motor 25 as being at fault, in spite of the low acceleration state.

Besides, whether or not the scanner motor 25 has arrived at the first reference speed Sp1 is judged at a stage earlier than its arrival at the rotational speed Spd in the beam-scan mode (S100). Therefore, the process of the image formation (the conveyance of the sheet of paper 3, etc.) can be made earlier to that extent, and the first printout time (time period which is required till the completion of the printing of the first sheet) can be shortened.

Besides, when the difference between each reference speed and the rotational speed Spd in the beam-scan mode is set to be large, whether or not the scanner motor 25 has arrived at the reference speed can be judged at an earlier stage, and it is permitted to shorten the first printout time. However, when the difference between the reference speed and the rotational speed Spd in the beam-scan mode is large especially in the low acceleration state of the scanner motor 25, a time period which is required since the arrival of the scanner motor 25 at the reference speed, till the arrival thereof at the rotational speed Spd in the beam-scan mode, becomes liable to disperse depending upon environmental conditions. It is therefore difficult to set a time period in which the image formation is actually initiated after the judgment that the scanner motor 25 has arrived at the reference speed. When the set time period is too short, it is apprehended that the image formation will begin before the arrival of the scanner motor 25 at the target rotational speed Spd, and that an image to be formed will be adversely affected. To the contrary, when the set time period is long, a wasteful wait time increases to incur the problem that the first printout time lengthens. In contrast, according to aspects of the invention, the first reference speed Sp1 (and the second reference speed) is (are) set at the comparatively small value, and the third reference speed Sp3 is set at the value larger than the first reference speed Sp1 (and the second reference speed), whereby the image formation can be reliably performed. More specifically, in the ordinary condition, whether or not the scanner motor 25 has arrived at the first reference speed Sp1 is judged early, thereby to shorten the first printout time. At the low temperature, the image formation is performed after the scanner motor 25 has arrived at the third reference speed Sp3 which is larger than the first reference speed Sp1.

Besides, in the case where the scanner motor 25 has not arrived at the third reference speed Sp3 within the third term T3 (S105: No), the fault of the scanner motor 25 is decided. Therefore, the fault can be appropriately coped with.

<Other Aspects>

Although aspects of the present invention has been described above, the invention is not restricted to the foregoing aspects, but it can adopt various aspects as indicated below by way of example.

(1) Aspects have mentioned the example in which the configuration of the invention as the image forming apparatus is applied to the laser printer 1. However, the configuration of the invention as the image forming apparatus is similarly applicable to any of a copying machine, a facsimile equipment, etc. as long as it has the function of forming an image.

(2) In the example structure, the third judgment process (S105) for judging whether or not the scanner motor has arrived at the third reference speed is executed in the case (S104: Yes) where the arrival of the scanner motor at the second reference speed has been judged in the second judgment process (S104). However, the third judgment process may well be omitted so as to initiate the image formation process from the conveyance of the sheet of paper (S101) directly in the case (S104: Yes) where the arrival at the second reference speed has been judged by the second judgment process. On this occasion, when the second reference speed is set at the value equal to the speed in the beam-scan mode, the image formation can be performed at the point of time at which the scanner motor 25 has actually become the speed in the beam-scan mode, and hence, the image formation can be reliably performed even in the case of the low temperature.

(3) In the example structure, whether or not the scanner motor has arrived at the second reference speed within the second term is judged in the second judgment process. According to the invention, however, the second term need not be especially stipulated, but the image formation may be initiated at the point of time at which the scanner motor has arrived at the second reference speed.

What is claimed is:

1. An image forming apparatus comprising:
    a scanner motor that rotates a polygon mirror;
    a speed information detection unit that detects speed information corresponding to a rotational speed of the scanner motor;
    a first judgment unit that judges on the basis of the speed information whether or not the scanner motor has arrived at a first reference speed, which is lower than a rotational speed in scanning, within a first term since drive initiation of the scanner motor;
    a second judgment unit that judges on the basis of the speed information whether or not the scanner motor has arrived at a second reference speed, which is not lower than the first reference speed, after the first term, in a case where the first judgment unit has judged that the scanner motor has not arrived at the first reference speed within the first term; and
    an image formation unit that initiates an image formation process in a case where the first judgment unit has judged that the scanner motor has arrived at the first reference speed within the first term, and in a case where the second judgment unit has judged that the scanner motor has arrived at the second reference speed.

2. The image forming apparatus according to claim 1, wherein, in judging whether or not the scanner motor has arrived at the second reference speed, the second judgment unit judges whether or not the scanner motor has arrived at the second reference speed within a second term after the first term.

3. The image forming apparatus according to claim 2, further comprising a fault decision unit that decides a fault of the scanner motor in a case where the second judgment unit has judged that the scanner motor has not arrived at the second reference speed within the second term.

4. The image forming apparatus according to claim 2, wherein the first reference speed is set at a value that is equal to the second reference speed;
    the image forming apparatus further comprises a third judgment unit that judges on the basis of the speed information whether or not the scanner motor has arrived at a third reference speed, which is larger than the second reference speed, within a third term after the first term, in a case where the second judgment unit has judged that the scanner motor has arrived at the second reference speed within the second term; and
    the image formation unit initiates the image formation process in a case where the third judgment unit has judged that the scanner motor has arrived at the third reference speed within the third term.

5. The image forming apparatus according to claim 4, wherein a fault decision unit decides a fault of the scanner motor in a case where the third judgment unit has judged that the scanner motor has not arrived at the third reference speed within the third term.

6. The image forming apparatus according to claim 1, wherein the speed information detection unit comprises first and second sensors.

7. The image forming apparatus according to claim 6, wherein the first sensor comprises a frequency generator that generates a signal in a waveform, and the second sensor comprises a beam detector that detects a laser beam reflected by the polygon mirror.

8. The image forming apparatus according to claim 7, wherein the frequency generator detects the speed information in a case where the rotational speed of the scanner motor is at or below a predetermined value, and the beam detector detects the speed information in a case where the rotational speed of the scanner motor exceeds the predetermined value.

9. A computer readable medium containing a program product for enabling a computer in an image forming apparatus, which has a scanner motor that rotates a polygon mirror, to execute instructions comprising:
    detecting speed information corresponding to a rotational speed of the scanner motor;
    judging on the basis of the speed information whether or not the scanner motor has arrived at a first reference speed being lower than a rotational speed in scanning, within a first term since drive initiation of the scanner motor; and
    judging on the basis of the speed information whether or not the scanner motor has arrived at a second reference speed not being lower than the first reference speed, after the first term, in a case where it is judged that the scanner motor has not arrived at the first reference speed within the first term.

* * * * *